United States Patent
Jones et al.

(10) Patent No.: US 6,362,446 B1
(45) Date of Patent: Mar. 26, 2002

(54) METHOD FOR DRILLING HOLLOW COMPONENTS

(75) Inventors: Marshall Gordon Jones, Scotia; Steven Robert Hayashi, Schenectady; Bin Wei, Mechanicville, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/366,309

(22) Filed: Aug. 2, 1999

(51) Int. Cl.⁷ .................................................. B23H 1/00
(52) U.S. Cl. ................... 219/69.11; 219/69.15; 219/69.17
(58) Field of Search ............. 219/69.11, 69.15, 219/69.17, 68, 121.6, 121.7, 121.71, 121.73

(56) References Cited

U.S. PATENT DOCUMENTS

| | | | |
|---|---|---|---|
| 4,762,464 A | * 8/1988 | Vertz et al. | 416/97 R |
| 4,808,785 A | 2/1989 | Vertz et al. | 219/69 M |
| 4,857,696 A | * 8/1989 | Taeusch et al. | 219/121.7 |
| 4,873,414 A | 10/1989 | Ma et al. | 212/121.62 |
| 5,043,553 A | 8/1991 | Corfe et al. | 219/121.7 |
| 5,049,722 A | 9/1991 | Corfe et al. | 219/121.7 |
| 5,216,808 A | * 6/1993 | Martus et al. | 29/889.1 |
| 5,291,654 A | 3/1994 | Judd et al. | 29/889.721 |
| 5,683,600 A | 11/1997 | Kelley et al. | 219/121.71 |
| 5,685,971 A | * 11/1997 | Schroder et al. | 205/642 |
| 5,739,502 A | 4/1998 | Anderson et al. | 219/121.71 |
| 6,054,673 A | * 4/2000 | Chen | 219/121.71 |

\* cited by examiner

*Primary Examiner*—M. Alexandra Elve
(74) *Attorney, Agent, or Firm*—Penny Clarke; Donald S. Ingraham

(57) ABSTRACT

An apparatus for drilling cooling holes through a wall of a hollow component is disclosed. First, a laser drill is used for drilling at least one rough blind hole within a component wall, for example a turbine airfoil, so as to retain a residual bottom plate portion. Next, an electro discharge machine (EDM), for example a rotating EDM or plunge EDM, is used for finishing at least one rough blind hole so as to create at least one finished hole and breaking through the bottom plate portion.

10 Claims, 3 Drawing Sheets

METHOD FOR DRILLING HOLLOW COMPONENTS

BACKGROUND OF THE INVENTION

This invention relates generally to drilling and more specifically to drilling of cooling holes in turbine airfoil components with a laser and an electro discharge machine (EDM) without the use of a beam blocking material such as wax.

There are many hole making techniques that are used for making cooling holes in turbine airfoil components. These techniques include, for example, laser, EDM, rotating EDM, shaped tube electrolytic machining (STEM) and electrochemical streaming (ES) hole drilling. Laser drilling is the fastest of the hole making techniques but has the problem of potentially damaging the surface of the opposing wall in a hollow airfoil, for example. In most conventional laser drilling processes in hollow airfoils, wax is used to attenuate the laser beam before reaching the wall opposite the drilled hole, preventing damage to the opposing wall. A drawback of this method, however, is that the process of adding and removing the wax is costly in the drilling process. In addition, if laser parameters are not properly selected, the formation of recast (liquid metal that has resolidified on the wall of the hole) on the hole being drilled can lead to cracking during the life of a rotating part. Furthermore, improper laser parameters can lead to having a hole drilled with a taper.

A rotating EDM can drill a small cooling hole at approximately 1.9 inches/minute. This rate is over two orders of magnitude faster than EDM with plunge electrodes. In most super alloys, the time for laser hole drilling is over an order of magnitude faster than rotating EDM. One drawback of the plunge electrode EDM is that the drilling speed is decreased for high aspect ratio holes, for example, small diameter and large depth. This reduction of speed is due to difficulties in expelling eroded metal debris out of the drilling area.

Accordingly, there is a need in the art for an improved method of drilling cooling holes in turbine airfoil components.

BRIEF SUMMARY OF THE INVENTION

An apparatus for drilling cooling holes through a wall of a hollow component is disclosed. First, a laser drill is used for drilling at least one rough blind hole within a component wall, for example a turbine airfoil, so as to retain a residual bottom plate portion. Next, an electro discharge machine (EDM), for example a rotating EDM or plunge EDM, is used for finishing at least one rough blind hole so as to create at least one finished hole and breaking through the bottom plate portion.

DETAILED DESCRIPTION OF THE INVENTION

Figure 1:
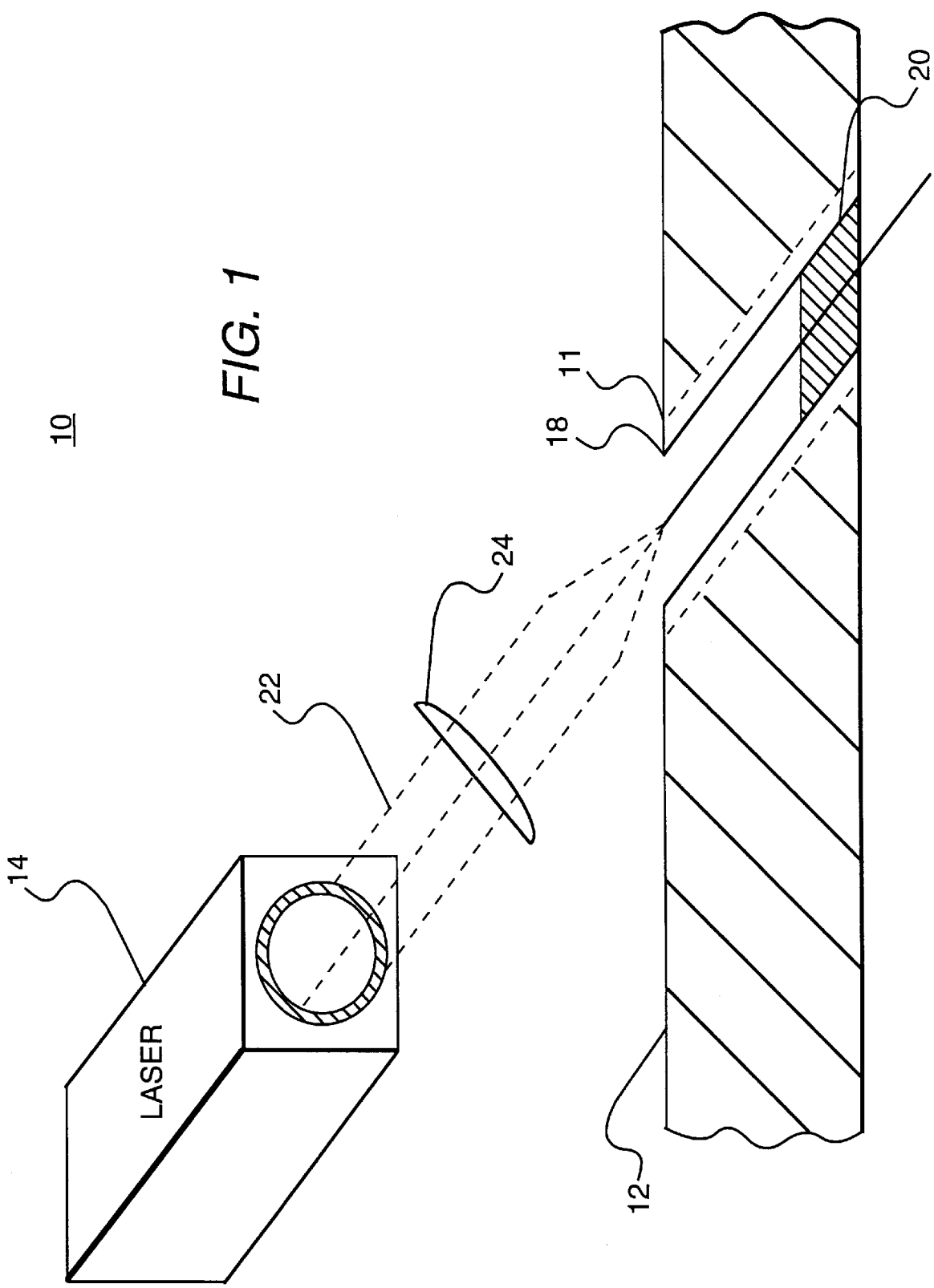
FIG. 1 is a schematic view of a laser drill in accordance with one embodiment of the instant invention.
Figure 2:
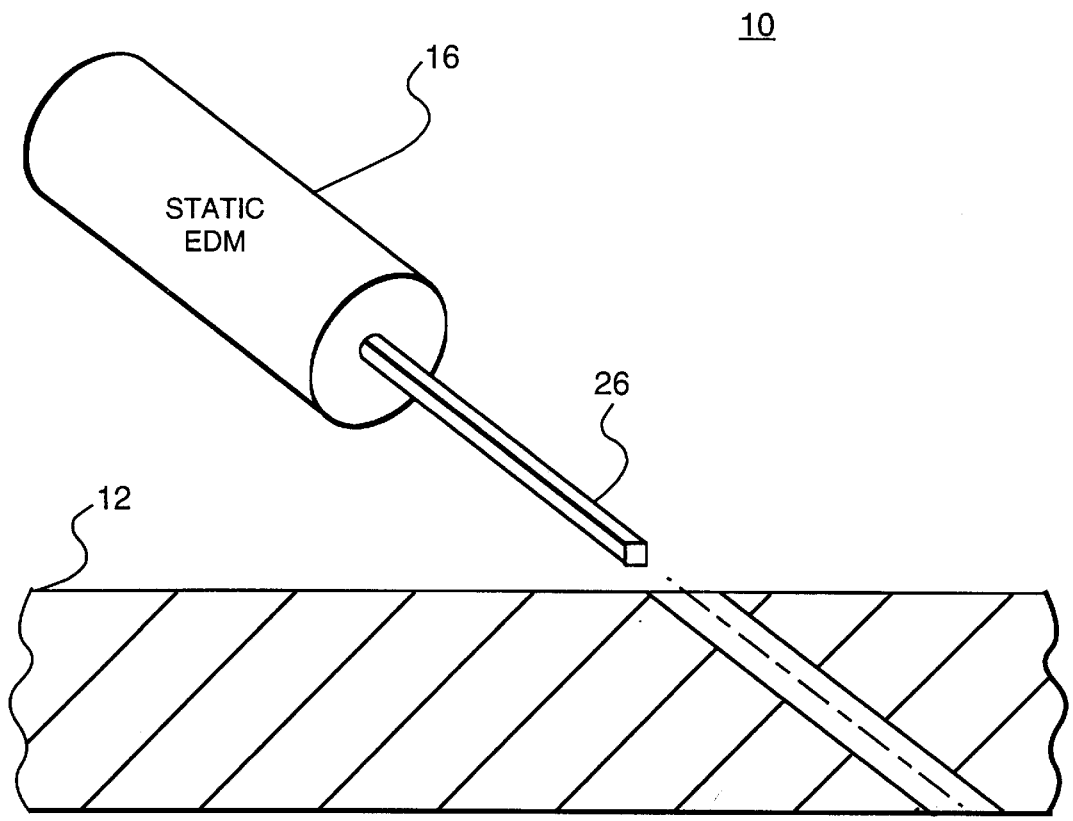
FIG. 2 is a schematic view of a rotating electro discharge machine in accordance with one embodiment of the instant invention.
Figure 3:
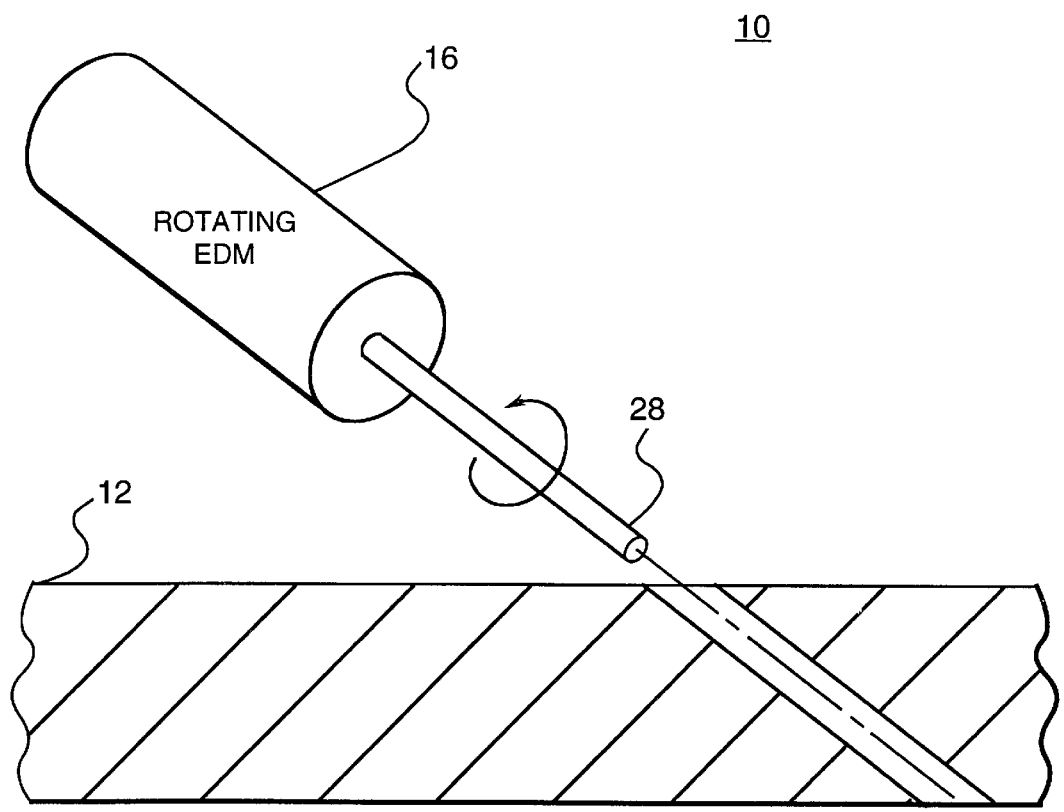
FIG. 3 is a schematic view of a plunge electro discharge machine in accordance with another embodiment of the instant invention.

An apparatus 10 and process for drilling cooling holes 11 through a wall 12 of a hollow component is shown in FIGS. 1–3. The process of the instant invention includes the integration of a laser drill 14 (FIG. 1) and an electro discharge machine 16 (EDM) (FIG. 2 or 3), for example, a plunge EDM.

First, laser drill 14 (FIG. 1) is used for drilling at least one rough blind hole 18 within wall 12 so as to retain a bottom plate portion 20. As used herein, the phrase "rough blind hole" 18 is defined as a hole that is smaller in diameter than a required finished hole 11, including a bottom plate portion 20.

In one embodiment, laser drill 14 comprises a neodymium (Nd) yttrium-aluminum-garnet (YAG) laser. In another embodiment, the wavelength of a laser beam 22 generated by laser drill 14 is in the range between about 1 $\mu$m to about 1.1 $\mu$m.

Next, EDM 16 (FIG. 2 or 3) is used for finishing rough blind hole 18 (FIG. 1) and for removing bottom plate portion 20 of wall 12.

In operation, the component to be drilled, an airfoil, for example, is mounted on a fixture (not shown). A numerical control (NC) machine, or the like, coupled to the fixture is used to control the position of the component in relation to each tool, laser drill 14 or EDM 16 (FIG. 2 or 3). In addition, NC machine is used to control the angle of laser drill 14 (FIG. 1), for example, a laser drill 14 angle in the range between about 10° to about 90°. Next, laser drill 14 directs a laser beam 22 typically through an optical disk 24 at wall 12 to drill at least one rough blind round or non-round cooling hole 18. Optical disk 24 enables laser beam 22 to be focused at different intensities. The depth of rough blind hole 18 can be controlled by controlling the amount of energy in each laser pulse and the number of laser pulses that are needed.

Next, a second finishing step is used to drill a finish hole 11 with a plunge EDM 16 or a rotating EDM 16 (FIG. 2 or 3). A tooling fixture, with hole position guides, may be used to locate rough blind hole 18 (FIG. 1) to EDM 16 (FIG. 2 or 3). Additionally a flexible system, for example, a multi-axis numerically controlled (NC) mechanism, may be used to program plunge electrode 26 (FIG. 2) or rotating electrode 28 (FIG. 3) position after the rough blind hole 18 (FIG. 1) has been laser drilled.

After plunge electrode 26 (FIG. 2) or rotating electrode 28 (FIG. 3) is positioned, a dielectric fluid, for example, deionized water or hydrocarbon oil, is delivered between the electrode and the workpiece. Electric discharging will occur when EDM 16 (FIG. 2 or 3) power is on causing the workpiece material to be eroded by the sparks.

In one embodiment, a user determines the shape of the finished hole 11 (FIG. 1) by choosing an electrode shape accordingly. The plunge electrode 26 (FIG. 2), with desired shape, for example, square, rectangular, elliptical, oval, race track, tapered (diffuser), squire, tubular, etc., will plunge into wall 12 (FIG. 1) and break through the bottom plate portion 20 of the rough blind hole 18.

In another embodiment, an EDM 16 (FIG. 3) with a rotating electrode 28, can drill a round finished hole 11 (FIG. 1) at a high speed to break the bottom plate 20 portion of rough blind hole 18.

Using laser drill 14 to drill the majority of the depth, for example, 80% to 95% of the depth of the required finished hole 11, and for the majority of the diameter, for example, 80% to 90% of the diameter of the required finished hole 11, eliminates the need for noncentral holes and enables large electrolyte delivery, fast cutting speeds and better finished hole 11 surface finish. Using EDM 16 (FIG. 2 or 3) to drill the finished hole 11 (FIG.1) and the bottom plate portion 20 of the rough blind hole 18, eliminates the need for laser beam 22 blocking material, for example, wax, and avoid recast (liquid metal that has resolidified on the wall of the wall) on the finished hole 11.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for drilling holes through a wall of a hollow component, said method comprising:

laser drilling at least one rough blind hole within the wall so as to retain a residual bottom plate portion of the rough blind hole; and machining the rough blind hole to finish the rough blind hole and to remove the residual bottom plate portion, so as to create at least one finished hole.

2. The method of claim 1, wherein the component is an airfoil.

3. The method of claim 1, wherein said machining step includes electro discharge machining the rough blind hole.

4. The method of claims 3, wherein said laser drilling step includes lasing the wall with a neodymium (Nd) yttrium-aluminum-garnet (YAG) laser.

5. The method of claim 3, wherein said machining step includes electro discharge machining the rough blind hole using a rotating electro discharge machine.

6. The method of claim 3, wherein said machining step includes electro discharge machining the rough blind hole using a plunge electrode electro discharge machine.

7. The method of claim 3, wherein said electro discharge machining step includes using an electrode having a square, rectangular, elliptical, oval, racetrack, tapered (diffuser), or tubular cross-section.

8. The method of claim 3, wherein said laser drilling step includes controlling an outside diameter of the rough blind hole to be within a range between about eighty percent and ninety percent of a diameter of the finished hole.

9. The method of claim 3, wherein said laser drilling step includes controlling a depth of the rough blind hole to be within a range between about eighty percent to about ninety five percent of a depth of the finished hole.

10. The method of claim 3, wherein said laser drilling step includes lasing the wall at a laserbeam wavelength in a range between about 1.0 $\mu$m to about 1.1 $\mu$m.

* * * * *